US010232765B2

(12) United States Patent
Fimeri et al.

(10) Patent No.: US 10,232,765 B2
(45) Date of Patent: Mar. 19, 2019

(54) LAMP ASSEMBLY FOR A VEHICLE

(71) Applicant: SMR Patents S.à.r.l., Luxembourg (LU)

(72) Inventors: Garry Gordon Leslie Fimeri, Adelaide (AU); Simon Belcher, Adelaide (AU); James Nicholas Dickson, Adelaide (AU)

(73) Assignee: SMR Patents S.à.r.l., Luxembourg (LU)

(*) Notice: Subject to any disclaimer, the term of this patent is extended or adjusted under 35 U.S.C. 154(b) by 0 days.

(21) Appl. No.: 15/522,311

(22) PCT Filed: Oct. 27, 2015

(86) PCT No.: PCT/IB2015/058255
§ 371 (c)(1),
(2) Date: Apr. 27, 2017

(87) PCT Pub. No.: WO2016/067185
PCT Pub. Date: May 6, 2016

(65) Prior Publication Data
US 2017/0327032 A1 Nov. 16, 2017

(30) Foreign Application Priority Data
Oct. 27, 2014 (AU) ................................ 2014904289

(51) Int. Cl.
*B60Q 1/32* (2006.01)
*B60Q 1/26* (2006.01)
(Continued)

(52) U.S. Cl.
CPC ............. *B60Q 1/2665* (2013.01); *B60Q 1/32* (2013.01); *B60R 1/06* (2013.01); *B60R 1/1207* (2013.01);
(Continued)

(58) Field of Classification Search
CPC ................................ B60Q 1/2665; B60Q 1/32
(Continued)

(56) References Cited

U.S. PATENT DOCUMENTS

2002/0041498 A1* 4/2002 Furst .................... B60Q 1/2665
362/494
2003/0193815 A1 10/2003 Mishimagi
(Continued)

FOREIGN PATENT DOCUMENTS

| CN | 201688283 U | 12/2010 |
| CN | 203511475 U | 4/2014 |

(Continued)

OTHER PUBLICATIONS

International Search Report dated Feb. 12, 2016, 4 pgs.
PCT Written Opinion of the International Searching Authority, Application No. PCT/IB2015/058255, dated Feb. 12, 2016, 8 pgs.

*Primary Examiner* — Christopher Raabe
(74) *Attorney, Agent, or Firm* — Jones Day

(57) ABSTRACT

A lamp assembly for illuminating a ground area adjacent a vehicle is disclosed. The assembly includes a housing; an outer lens covering the housing; a plurality of light emitting diode (LED) light sources arranged in the housing; and a reflector mounted in the housing. The light emitted from the plurality of LED light sources is captured by the reflector which reflects light towards the lens, the lens directing light generally downward towards the ground area. The light output from the lamp assembly appears to be emitted from a single light source.

9 Claims, 8 Drawing Sheets

(51) Int. Cl.
*B60R 1/06* (2006.01)
*B60R 1/12* (2006.01)
*F21S 43/19* (2018.01)
*F21S 43/14* (2018.01)
*F21S 43/20* (2018.01)
*F21S 43/31* (2018.01)
*F21S 43/40* (2018.01)
*B60Q 1/00* (2006.01)
*B60R 1/00* (2006.01)
*F21S 43/00* (2018.01)

(52) U.S. Cl.
CPC .............. *F21S 43/14* (2018.01); *F21S 43/195* (2018.01); *F21S 43/26* (2018.01); *F21S 43/31* (2018.01); *F21S 43/40* (2018.01); *B60Q 1/00* (2013.01); *B60R 1/00* (2013.01); *F21S 43/00* (2018.01)

(58) Field of Classification Search
USPC ......................................................... 362/549
See application file for complete search history.

(56) References Cited

U.S. PATENT DOCUMENTS

2010/0253500 A1  10/2010  Fukasawa et al.
2012/0081915 A1   4/2012  Foote
2014/0198515 A1   7/2014  Tulio

FOREIGN PATENT DOCUMENTS

| | | |
|---|---|---|
| DE | 3724943 A1 | 2/1989 |
| DE | 202014101755 U1 | 7/2014 |
| WO | 2014/106599 A1 | 7/2014 |

* cited by examiner

LAMP ASSEMBLY FOR A VEHICLE

CROSS-REFERENCE TO RELATED APPLICATIONS

This application is a national stage entry of International Patent Application No. PCT/IB2015/058255, filed Oct. 27, 2015, which claims the benefit of foreign priority to Australian Patent Application No. 2014904289, filed Oct. 27, 2014, each of which is incorporated herein by reference in its entirety for all purposes.

STATEMENT REGARDING FEDERALLY SPONSORED RESEARCH OR DEVELOPMENT

Not applicable.

REFERENCE TO A COMPACT DISK APPENDIX

Not applicable.

BACKGROUND

1. Field

The following description relates to lamp assemblies. Embodiments of the following description may be used in a ground illumination lamp for an exterior rear view mirror of a vehicle.

2. Description of Related Art

Lamp assemblies are being increasingly used in vehicle side mirrors (exterior rear view mirror assemblies) as value added features required by automotive manufacturers. Light emitting diodes (LEDs) or other similar point light sources are also being used more frequently as the light source in these lamp assemblies due to their efficiency and compact design.

An LED light source is inherently directional (with an approximate Lambertian distribution) meaning that the relative luminous intensity of the LED varies away from the optical axis of the LED. The luminous intensity is highest at 0° (along the optical axis) and drops off significantly as the viewing angle increases. When an LED is viewed directly (i.e. along the optical axis) the light source can appear very bright. As the power of the LED increases, the brightness can increase to a level whereby an uncomfortable glare is experienced by a person viewing the LED directly.

In some lamp assemblies, a high level of brightness is required. For example, a ground illumination lamp or spotlight integrated into a vehicle side mirror is required to illuminate an area of ground adjacent a vehicle. For the ground illumination lamp to be effective, a light source of high luminous intensity is needed. In the past, lamp assemblies that have been used to provide ground illumination have achieved the required level of brightness but in the process created too much unwanted glare. To reduce the glare, a lower power light source would have to be used which compromises the ability of the lamp assembly to appropriately illuminate the ground area.

The present invention seeks to provide an improved lamp assembly that overcomes some of the above mentioned difficulties or at least provides the public with a useful choice. Other advantages of the present invention will become apparent from the following description, taken in connection with the accompanying drawings, wherein, by way of illustration and example, a preferred embodiment of the present invention is disclosed.

SUMMARY

According to a first aspect, there is provided a lamp assembly for illuminating a ground area adjacent a vehicle, including: a housing; an outer lens covering the housing; a plurality of light emitting diode (LED) light sources arranged in the housing; a reflector mounted in the housing such that light emitted from the plurality of LED light sources is captured by the reflector which reflects light towards the lens, the lens directing light generally downward towards the ground area, wherein, light output from the lamp assembly appears to be emitted from a single light source.

In an embodiment, the reflector includes one or more segments, each of the one or more segments receiving light emitted from each of the plurality of LED light sources.

In some embodiments, each of the one or more segments has a generally concave or spherical curvature.

In some embodiments, each of the one or more segments has a multi-faceted reflective surface.

In one embodiment, the number of segments is equal to the number of LED light sources.

In embodiments, the reflector is mounted in the housing above the plurality of LED light sources such that the plurality of LED light sources each emit light upwards into the reflector.

In some embodiments, the plurality of LED light sources are mounted to a printed circuit board (PCB) that is located in the housing beneath the reflector. To prevent the lamp assembly from having a green glow, in embodiments, the PCB may be coated white around the plurality of LED light sources.

In some embodiments, there is provided a second PCB having a control circuit for driving the plurality of LED light sources, the first PCB and the second PCB spaced apart in the housing.

Preferably, the lens includes surface optics to direct light towards the ground area.

In embodiments, the surface optics include a plurality of notched regions having sloped or curved surfaces to refract light by varying amounts towards the ground area.

According to a second aspect, there is provided lamp assembly for reducing glare, including: a plurality of light emitting diode (LED) light sources; a reflector positioned above the plurality of LED light sources so that light is emitted from the plurality of LED light sources upwards into the reflector, the reflector including a plurality of reflective segments, each of the plurality of reflective segments illuminated by each of the plurality of LED light sources; wherein, the reflector substantially removes the directionality of the light emitted from the plurality of LED light sources to reduce glare.

BRIEF DESCRIPTION OF THE DRAWINGS

Embodiments of the present invention will be discussed with reference to the accompanying drawings wherein.

In the following description, like reference characters designate like or corresponding parts throughout the figures.

DETAILED DESCRIPTION

Figure 1:
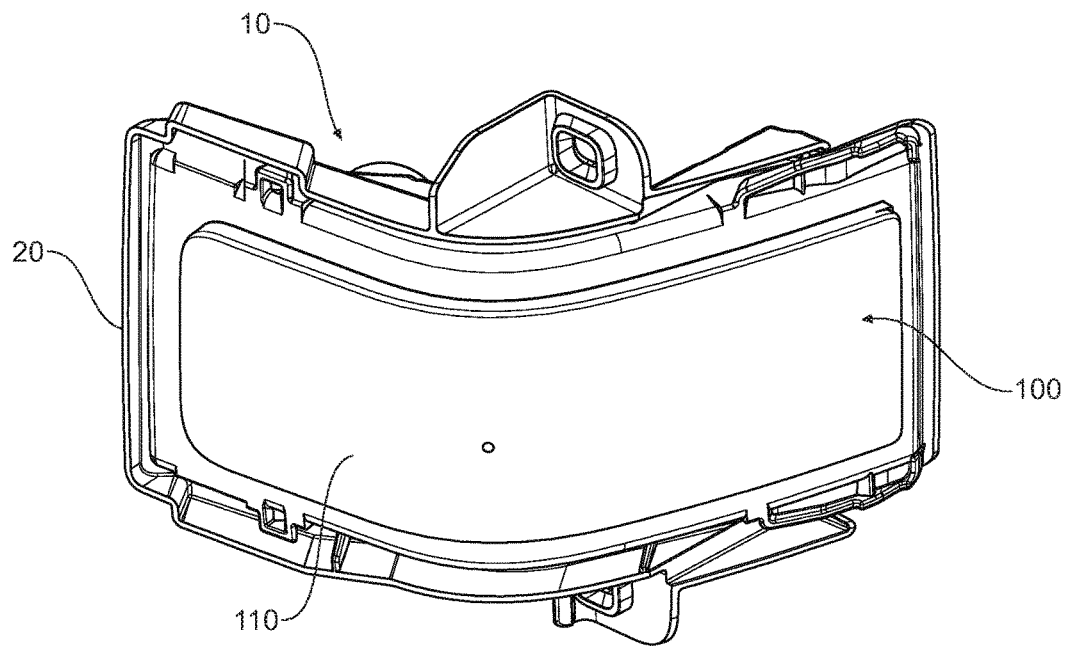
FIG. 1 is a perspective view of a lamp assembly for a vehicle according to an embodiment of the invention.

Referring now to FIG. 1, there is shown a lamp assembly 10 for a vehicle. The lamp assembly may be integrated into an exterior rear view mirror (side mirror) assembly of a vehicle. In one form, the lamp assembly provides a ground illumination light configured to illuminate a ground segment adjacent the vehicle (the lamp assembly 10 is preferably installed in both a left and a right hand side mirror of the vehicle for this purpose). The ground illumination light may illuminate an area approximately 3 m out from the side of the vehicle and is used for general illumination, such as when a user is setting up a camp site or changing a tyre.

The lamp assembly 10 has a housing 20, a reflective moulding 30 mounted into the housing (see FIG. 4B) and a lens 100 external to the housing covering the reflective moulding 30. The lens 100 is connected or joined to the housing 20 (e.g. by welding) and has an inner surface 120 (ref FIG. 7) and an outer surface 110 which provides a viewing surface that is illuminated by the lamp assembly 10 in use. The reflective moulding 30 may be manufactured from a polycarbonate (PC) or other suitable substrate material. The reflective moulding 30 is coated using a vacuum metallization process which provides a reflectivity of approximately 80%. Alternatively, the reflective moulding could be manufactured from a naturally reflective substrate such as white PC. The lens 100 may be manufactured from an acrylic (PMMA) or other suitable transparent or semi-transparent substrate, and would typically be 1-3 mm thick.

Figure 2:
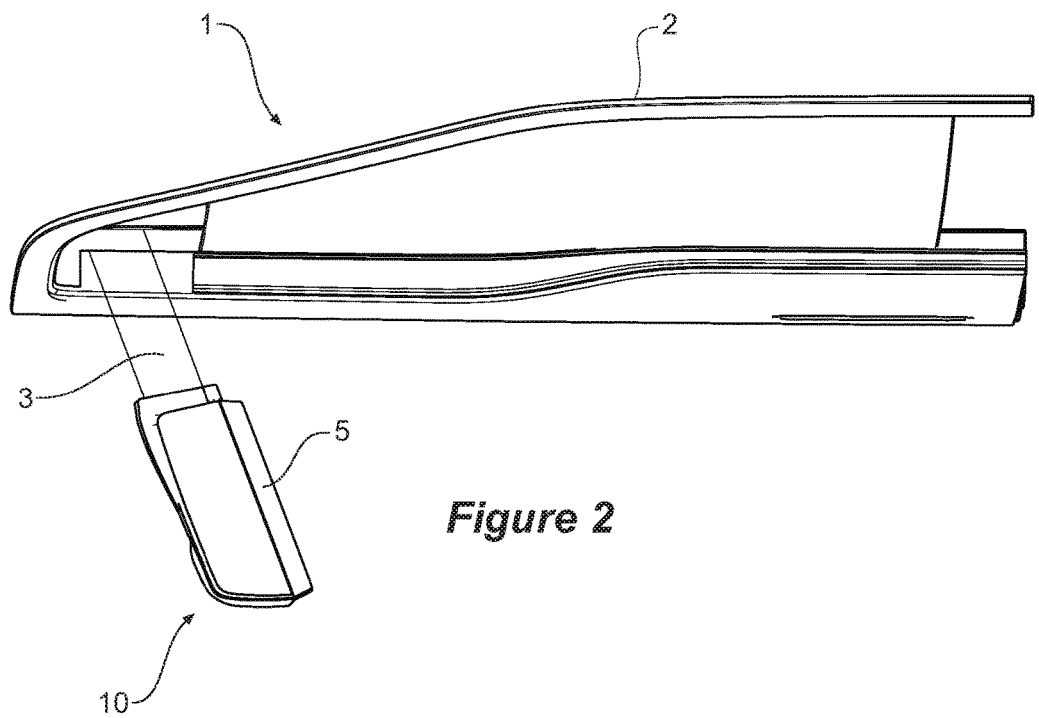
FIG. 2 is a is a top view of an exterior rear view mirror assembly mounted to a side door of a vehicle that is integrated with the lamp assembly.
Figure 3:
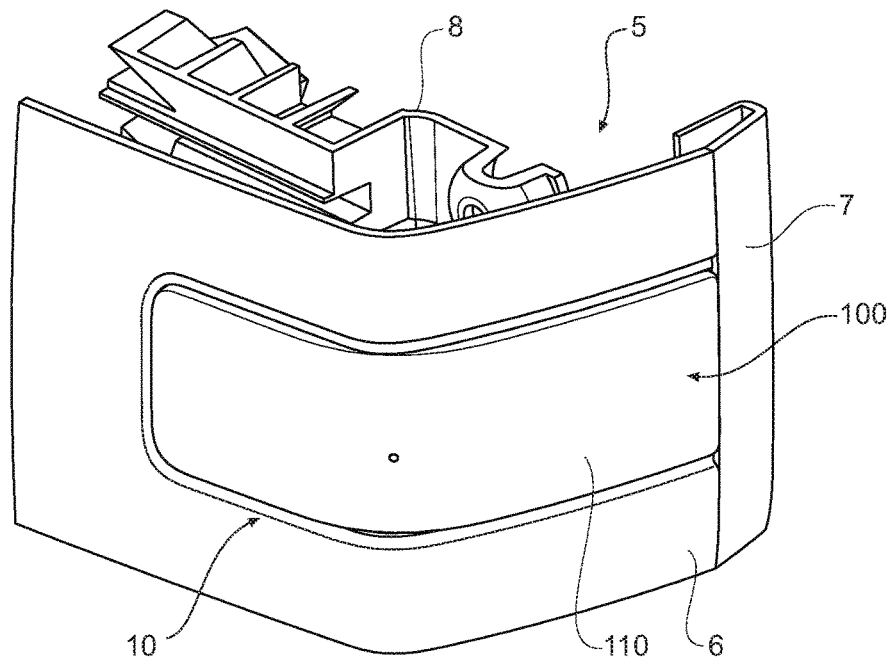
FIG. 3 is a perspective view of a portion of the exterior rear view mirror assembly of FIG. 2.

FIGS. 2 and 3 depict the lamp assembly 10 described herein integrated into an exterior rear view mirror assembly 5 of a vehicle 1. The mirror assembly 5 is mounted to a vehicle door 2 by a mirror arm 3 which extends from the side of the vehicle 1. The mirror assembly shown is on the left hand side of the vehicle. In an embodiment, the mirror assembly 5 may be mounted to the side of a truck (e.g. a light pickup truck or utility vehicle). The lamp assembly 10 shown in FIG. 1 is integrated into the mirror assembly 5 and is adapted to wrap around an outboard edge of the mirror assembly 5. In this way, the lamp assembly shown in FIG. 1 is formed at an obtuse angle.

Figure 4A:
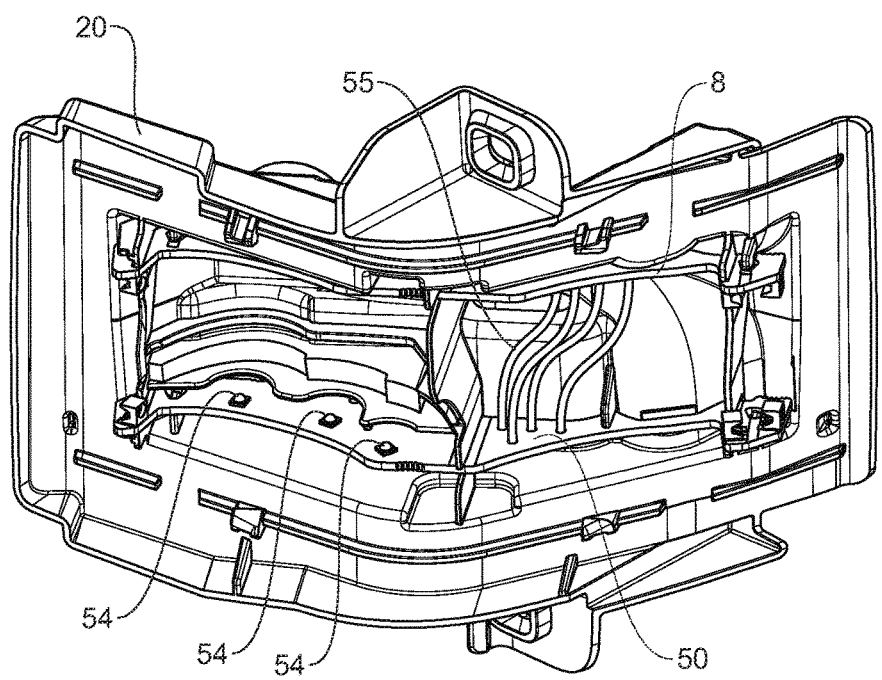
FIG. 4A is a perspective view of an embodiment of a housing used in the lamp assembly of FIG. 1.
Figure 4B:
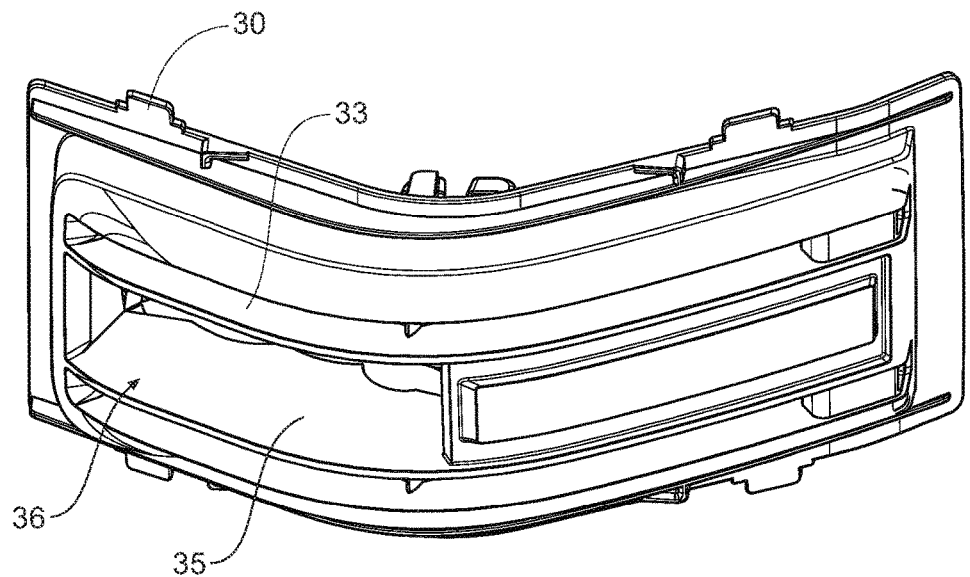
FIG. 4B is a perspective view of an embodiment of a moulded reflector used in the lamp assembly of FIG. 1.
Figure 4C:
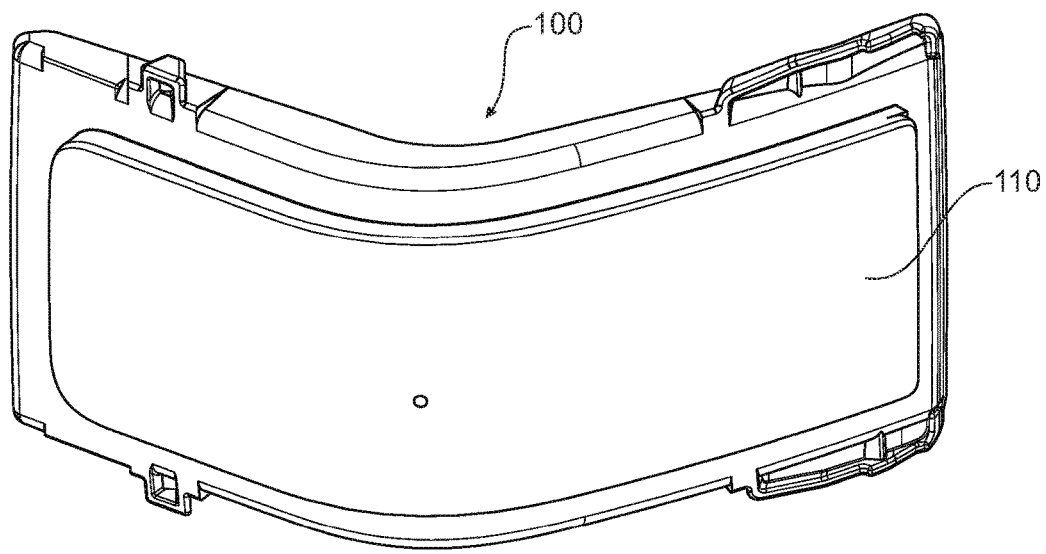
FIG. 4C is a perspective view of an embodiment of an outer lens used in the lamp assembly of FIG. 1.

Example components of the lamp assembly 10 according to an embodiment are shown in FIGS. 4A-4C. In FIG. 4a, the housing 20 is shown in further detail along with example components of the lamp assembly 10. The lamp housing 20 has slots for receiving a lower printed circuit board (PCB) 50 and an upper PCB 60 that are vertically spaced apart in the housing 20. In the depicted embodiment, three light sources 54 are mounted to the lower PCB 50. The light sources 54 are for the ground illumination light. Preferably, the light sources 54 are point light sources such as light emitting diodes (LEDs). In one form, each light source is a high powered (1 W) LED. The control or drive circuit for these high power LEDs 54 is on the upper PCB 60 such that the control circuit is physically separated from these high power LEDs 54. This separation minimises heat build-up and spreads the heat load which could otherwise cause an electronic component to overheat. The drive circuit for the high power LEDs 54 may consume 6 W of power. The upper and lower PCBs are electrically connected by wiring 55 as shown. In an embodiment, the lower PCB 50 is coated white locally around the LED light sources 54. The white coating may be achieved by a silk screening process or by simply using a white PCB. An advantageous effect of coating the PCB 50 white around the LED light sources 54 is that light output from the lamp assembly 10 remains white and does not have any undesirable green glow.

FIGS. 4b-4c provide perspective views of an embodiment of a reflector moulding 30 that is fitted into the housing 20 and the outer lens 100 that is externally mounted or fixed to the housing 20 so as to be positioned in front of the reflector moulding 30. Light output from the lamp assembly 10 is output through the lens 100 such that the outer surface 110 of the lens 100 is illuminated. In FIG. 4B the reflector moulding 30 is shown to include an opening 36 located between a lower surface 35 and a top surface 33 where there are located reflective surfaces for the ground illumination light.

Figure 5:
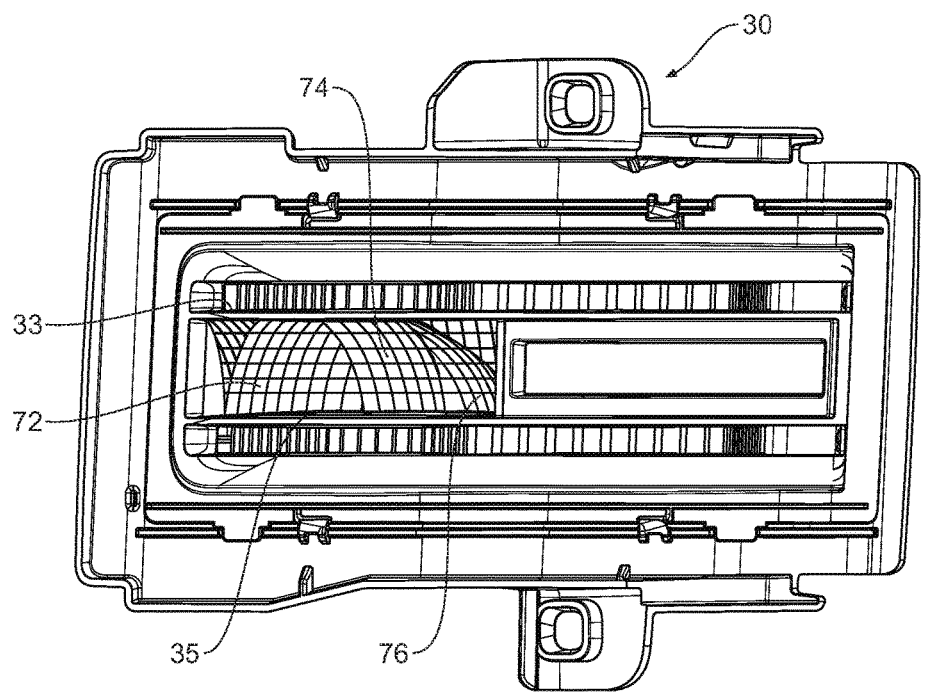
FIG. 5 is a side view of the lamp assembly of FIG. 1 with the outer lens removed to show detail of an embodiment of a reflector used to illuminate an area of ground adjacent a vehicle.
Figure 6:
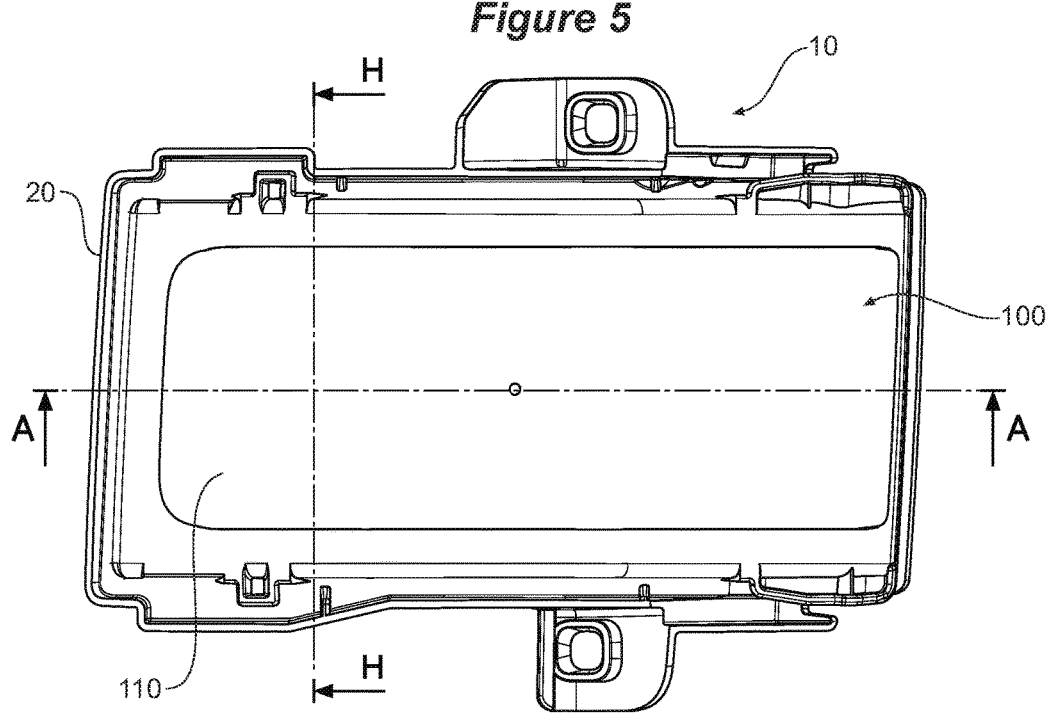
FIG. 6 is a side view of the lamp assembly of FIG. 1.
Figure 7:
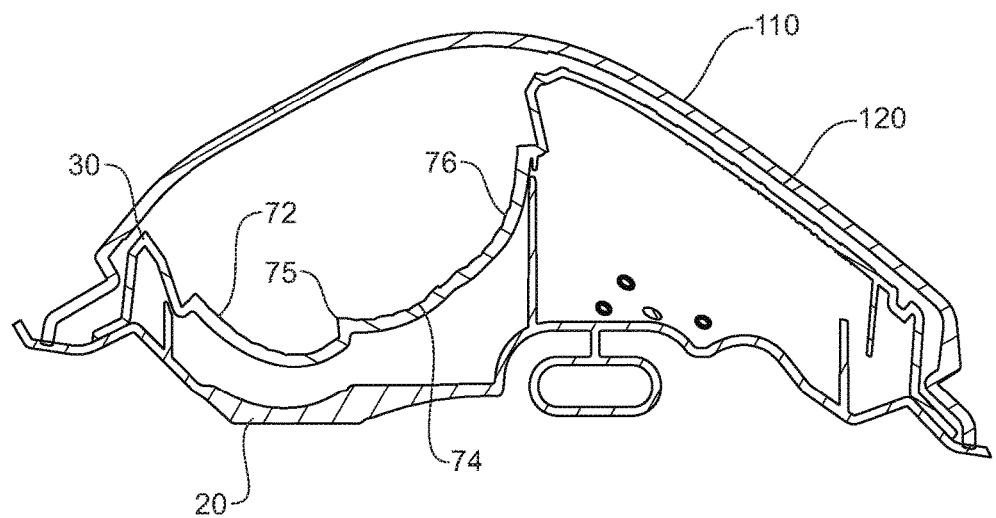
FIG. 7 is a sectional view through Section A-A of FIG. 6.

An embodiment of the reflector geometry for the ground illumination light is shown in FIG. 5 and in sectional view in FIG. 7. The reflector for the ground illumination light in an embodiment includes reflective surfaces or segments 72, 74 and 76 which are integrally moulded to form a single or unitary reflector. The segments 72, 74 and 76 are generally arcuate and in combination appear as a dome like structure that receives light from the LED light sources 54. A first segment 72 defines a complex curvature that may be described as being generally concave, spherical or part of a paraboloid. The first segment 72 may transition into a second segment 74 via a discrete step surface 75 as shown for example in FIG. 7. The second segment 74 is substantially concave although may also be spherical in some embodiments. The second segment 74 may transition into a third segment 76 by another step surface (not shown in FIG. 7). The third segment 76 is substantially concave although may also be spherical in some embodiments.

Each of the segments 72, 74 and 76 comprise a surface formed of multiple reflective facets. The reflective facets are arranged in a grid pattern and together form the generally concave shape of the reflective segments. The reflective facets are configured to reflect and spread the light towards the lens 100.

Figure 8:
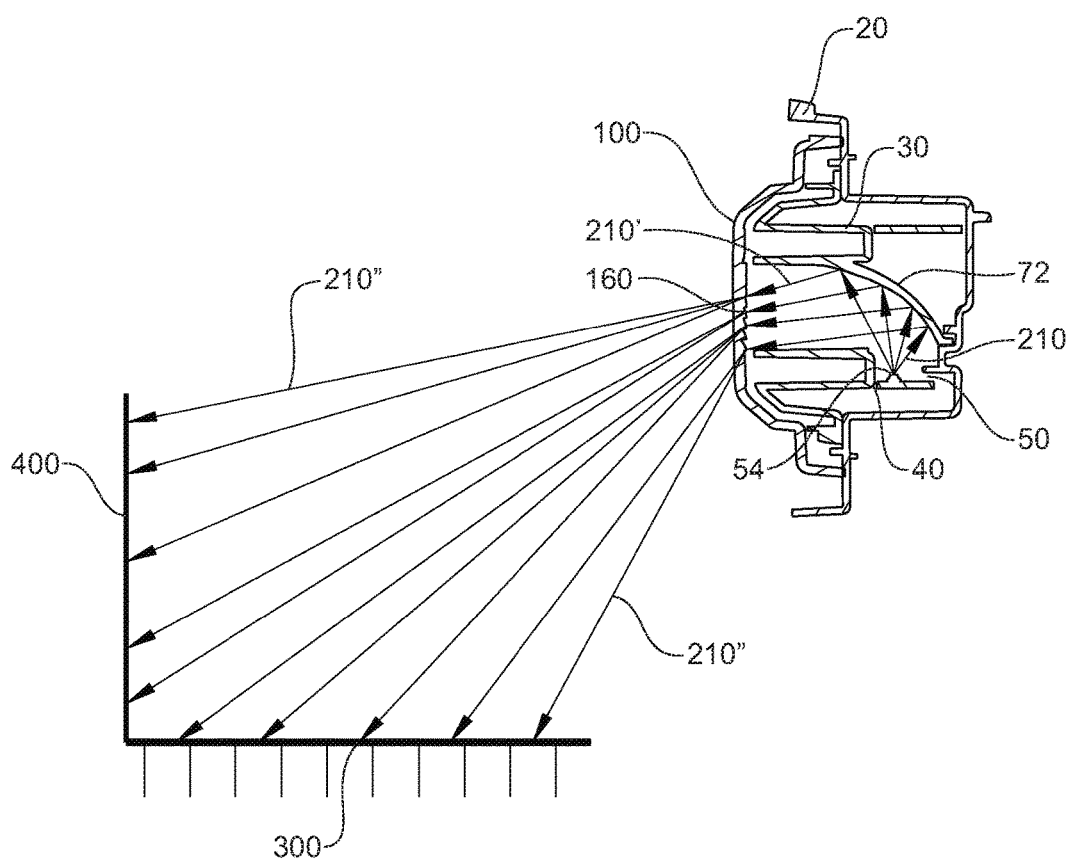
FIG. 8 is a sectional view through Section H-H of FIG. 6 which additionally shows an example path of light rays emitted from an LED light source.
Figure 9:
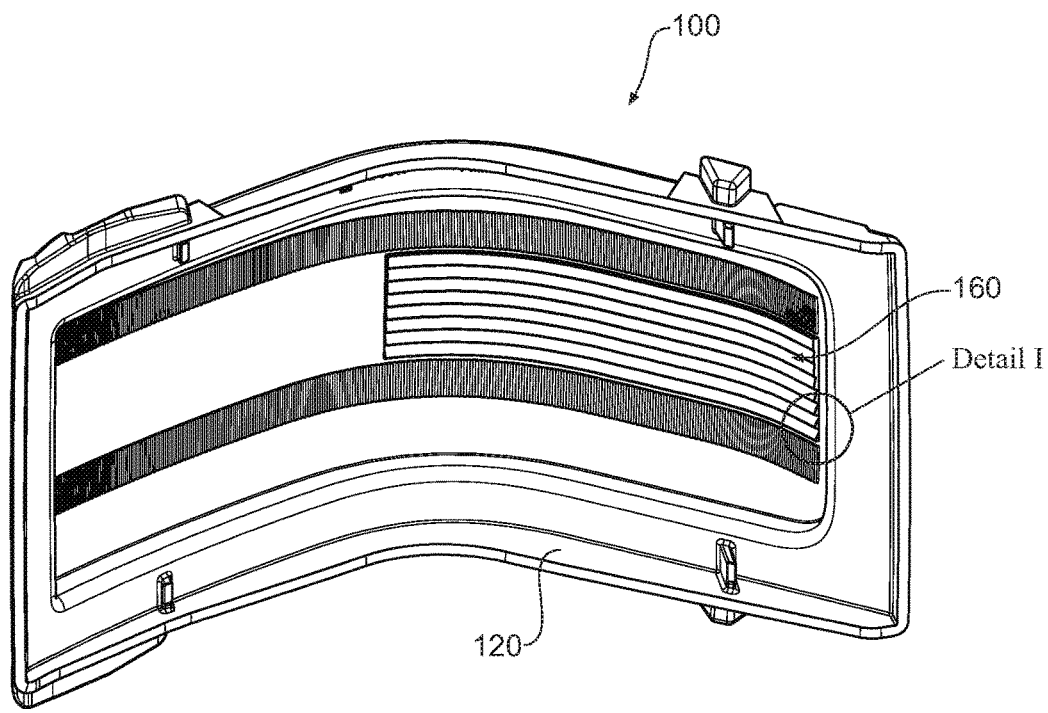
FIG. 9 is a rear perspective view of the outer lens showing surface optics on the inner surface of the lens.
Figure 10:
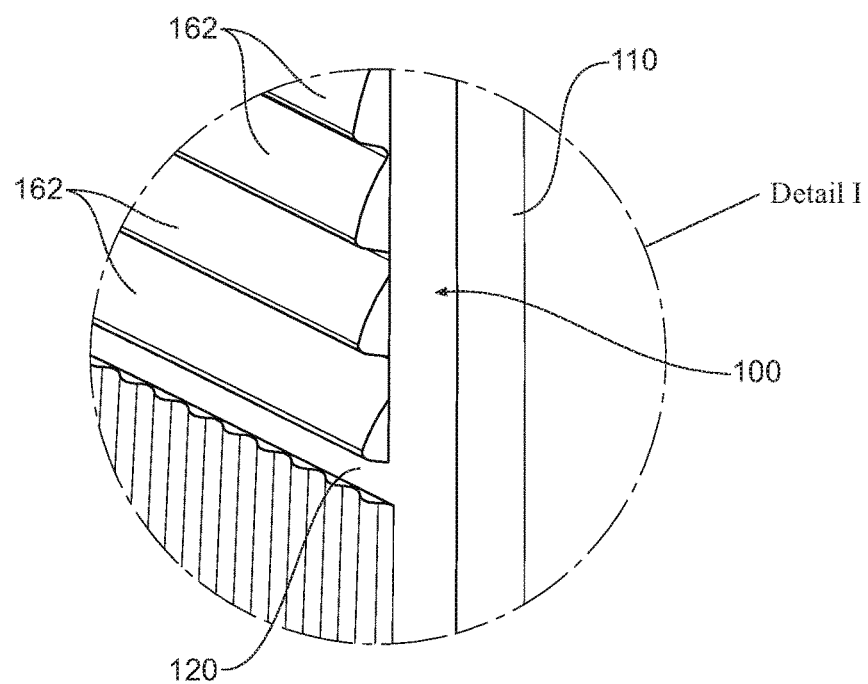
FIG. 10 provides an enlarged view of the detail at I in FIG. 9 showing in more detail the surface optics on the inner surface of the lens for the ground illumination light.
Figure 11:
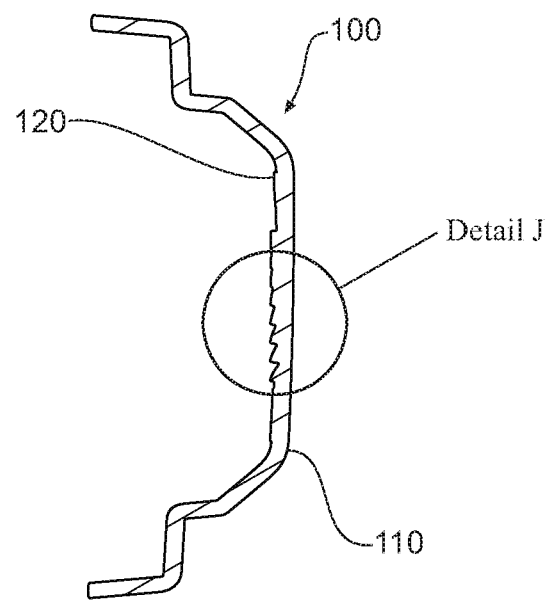
FIG. 11 is a sectional view through the outer lens.
Figure 12:
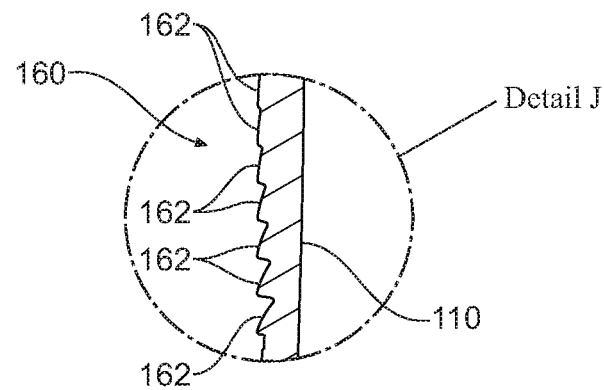
FIG. 12 provides an enlarged view of the detail at J in FIG. 10 showing in more detail the surface optics on the inner surface of the lens for the ground illumination light.

Referring now to FIG. 8, there is shown a sectional view through the first reflective segment 72 showing an example of the path of light rays emitted from one of the LED light sources 54. As shown, the reflector segment 72 is located above the lower PCB 50 and LED light source 54 such that light emitted from the light source 54 is emitted upwards into the reflector. The LED light source 54 is located behind a wall portion 40 of the reflector moulding such that it is not visible when the lamp assembly 10 is viewed directly. Rays of light 210 are emitted from the LED light source 54 and spread across the reflector segment 72. The reflector segment 72 reflects light generally downward towards a portion of the lens 100 having surface optics 160. The surface optics 160 are designed to direct light rays through the lens 100 towards a ground area adjacent the vehicle. Shown in FIG. 8 is a ground plane target 300 and a vertical plane target 400 which together define the area outside of the vehicle that is to be illuminated by the ground illumination light. The surface optics 160 function to distribute or spread light in a vertical plane.

The surface optics 160 formed on an inner surface 120 of the outer lens 100 are shown in further detail in FIGS. 9-12. The surface optics 160 in the embodiment depicted include a plurality of notched regions which extend horizontally across the inner surface 120 of the lens 100. The notched regions have sloped or curved surfaces 162 which function to refract incident light rays 210' from the reflector of the ground illumination light. The sloped surfaces 162 towards the top of the surface optics 160 are nearly vertically inclined. Towards the bottom of the surface optics 160, the sloped surfaces 162 protrude further inward towards outer surface 110 of the lens 100. In other words, the lower sloped surfaces 162 are less steep than the upper sloped surfaces 162. Light rays 210' incident on an upper portion of the surface optics 160 are therefore refracted less than light rays 210' incident on a lower portion of the surface optics 160.

Figure 13:
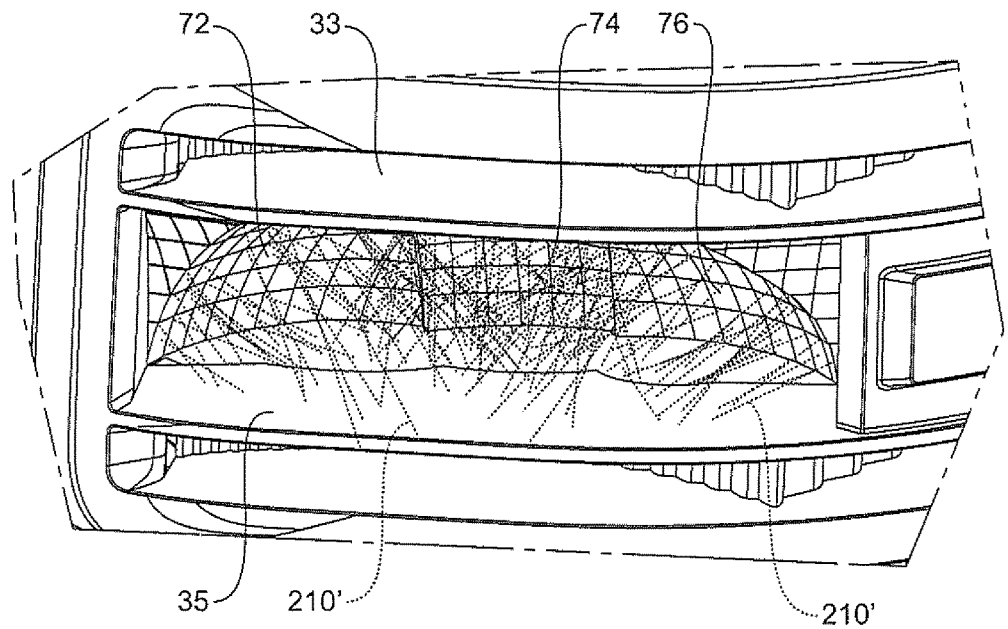
FIG. 13 is a front perspective view of a portion of the lamp assembly (with lens removed) showing schematically how light rays emitted from the LED light sources are reflected from the reflector to give the appearance of being from a single light source.
Figure 14:
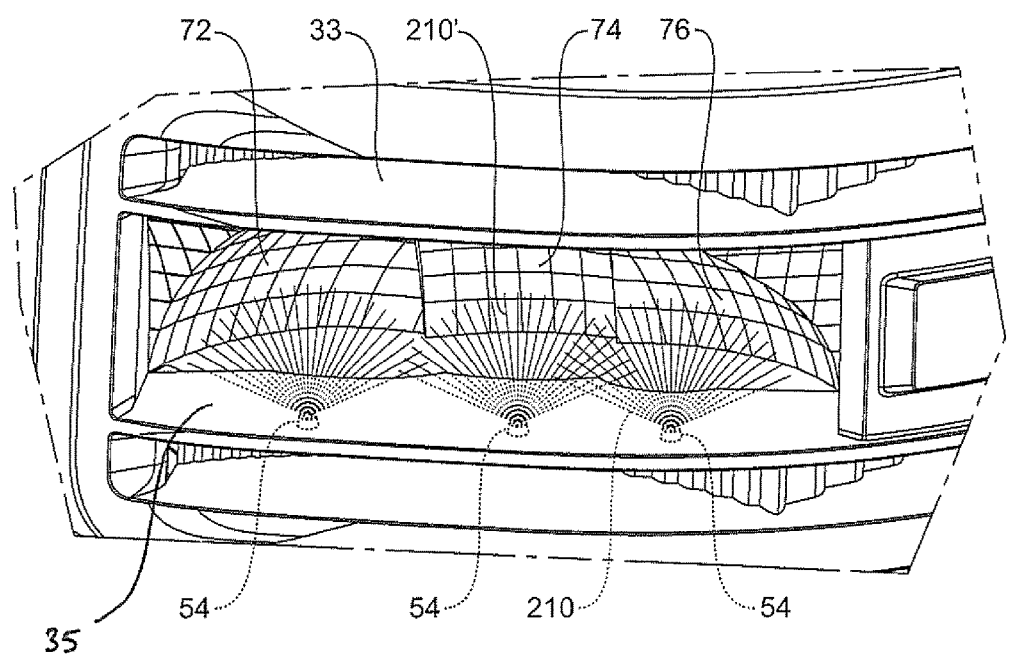
FIG. 14 shows another view of the reflector of the lamp assembly showing schematically how the light intensity from the LED light sources is distributed across the surface of the reflector.

FIGS. 13 and 14 provide views of the lamp assembly 10 which show how light from each of the plurality of LED light sources 54 is emitted into the reflector and then reflected by the reflective segments 72, 74, 76 towards the portion of the lens having the surface optics to direct light towards the area of ground to be illuminated. FIG. 14 diagrammatically shows three hidden (3) LED light sources 54 below and behind the reflective surface 35 (dotted outline represents the hidden LEDs and their light rays. The light path is shown in FIG. 8.

Light emitted from each LED light source 54 is received by a portion of each segment 72, 74, 76. For example, reflector segment 72 receives light emitted from the first LED light source 54, the second LED light source 54 and the third LED light source 54. Likewise, segments 74 and 76 receive light from each LED light source 54. The light emitted from each LED light source 54 (light rays 210) is therefore mixed such that the light intensity from the LED light sources 54 is spread quite evenly between the reflective segments 72, 74, 76 of the reflector. Light rays 210' reflected from the reflective segments 72, 74, 76 are further spread and mixed by the curvature of the segments.

The reflector arrangement disclosed enables light to be output through the lens 100 with the appearance of having been emitted from a single light source. Due to the mixing and spreading of the light emitted from the LED light sources 54 and distribution of the light intensity across a relatively large reflective surface area the overall glare of the lamp assembly 10 is able to be reduced to a comfortable level while still providing a suitably bright source to illuminate the ground area adjacent the vehicle. The reflector arrangement advantageously removes the directionality from the LED light sources and distributes the light across the reflective segments 72, 74 and 76.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

Please note that the following claims are provisional claims only, and are provided as examples of possible claims and are not intended to limit the scope of what may be claimed in any future patent applications based on the present application. Integers may be added to or omitted from the example claims at a later date so as to further define or re-define the invention.

The invention claimed is:

1. A lamp assembly for illuminating a ground area adjacent a vehicle, comprising:
    a housing;
    an outer lens covering the housing;
    a plurality of light emitting diode (LED) light sources arranged in the housing; and
    a reflector mounted in the housing such that light emitted from the plurality of LED light sources is captured by the reflector which reflects light towards the lens, the lens directing light generally downward towards the ground area,
    wherein the lens comprises surface optics to direct light towards the ground area,
    wherein the surface optics include a plurality of notched regions which extend horizontally across the inner surface of the lens and which have sloped surfaces to refract light by varying amounts towards the ground area,
    wherein the lower sloped surfaces towards the top of the surface optics are less steep than the upper sloped surfaces towards the bottom of the surface optics,
    wherein, light output from the lamp assembly appears to be emitted from a single light source, and
    wherein the reflector includes one or more segments, each of the one or more segments receiving light emitted from each of the plurality of LED light sources.

2. The lamp assembly of claim 1, wherein each of the one or more segments has a generally concave or spherical curvature.

3. The lamp assembly of claim 2, wherein the number of segments is equal to the number of LED light sources.

4. The lamp assembly of claim 1, wherein the reflector is mounted in the housing above the plurality of LED light sources such that the plurality of LED light sources each emit light upwards into the reflector.

5. The lamp assembly of any one of the preceding claims, wherein the plurality of LED light sources are mounted to a first printed circuit board (PCB) that is located in the housing beneath the reflector, the PCB coated white around the plurality of LED light sources.

6. The lamp assembly of claim 4, further including a second PCB having a control circuit for driving the plurality of LED light sources, the first PCB and the second PCB spaced apart in the housing.

7. The lamp assembly of claim 1, wherein the reflector is mounted in the housing above the plurality of LED light sources such that the plurality of LED light sources each emit light upwards into the reflector.

8. The lamp assembly of claim 7, wherein the plurality of LED light sources are mounted to a first printed circuit board (PCB) that is located in the housing beneath the reflector, the PCB coated white around the plurality of LED light sources.

9. The lamp assembly of claim 7, further including a second PCB having a control circuit for driving the plurality of LED light sources, the first PCB and the second PCB spaced apart in the housing.

* * * * *